(12) United States Patent
Stark (10) Patent No.: US 8,327,341 B2
(45) Date of Patent: Dec. 4, 2012

(54) INTEGRATING ASPECT ORIENTED PROGRAMMING INTO THE APPLICATION SERVER

(75) Inventor: Scott M. Stark, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1378 days.

(21) Appl. No.: 11/809,285

(22) Filed: May 31, 2007

(65) Prior Publication Data

US 2008/0301629 A1  Dec. 4, 2008

(51) Int. Cl.
- G06F 9/45 (2006.01)
- G06F 9/44 (2006.01)
- G06F 9/445 (2006.01)

(52) U.S. Cl. ......... 717/136; 717/108; 717/169; 717/177

(58) Field of Classification Search .................. None
See application file for complete search history.

(56) References Cited

U.S. PATENT DOCUMENTS

| | | | |
|---|---|---|---|
| 6,338,088 B1 | 1/2002 | Waters et al. | |
| 7,076,784 B1 | 7/2006 | Russell et al. | |
| 7,353,494 B2 | 4/2008 | Nielsen et al. | |
| 7,424,704 B2 * | 9/2008 | Orton et al. | 717/136 |
| 7,559,050 B2 | 7/2009 | Burger | |
| 7,584,281 B2 | 9/2009 | Bernardin et al. | |
| 7,685,577 B2 * | 3/2010 | Pace et al. | 717/136 |
| 7,810,082 B2 * | 10/2010 | Levenshteyn | 717/141 |
| 7,822,826 B1 * | 10/2010 | Savchenko et al. | 709/217 |
| 7,886,035 B2 * | 2/2011 | Stark | 709/223 |
| 8,166,152 B1 | 4/2012 | Delcheva et al. | |
| 2004/0039728 A1 * | 2/2004 | Fenlon et al. | 707/1 |
| 2004/0103416 A1 * | 5/2004 | Orton et al. | 719/328 |
| 2004/0177352 A1 * | 9/2004 | Narayanaswamy et al. | 717/169 |
| 2004/0230681 A1 | 11/2004 | Strassner | |
| 2004/0255010 A1 | 12/2004 | Finni | |
| 2005/0132339 A1 * | 6/2005 | Maron | 717/136 |
| 2005/0204344 A1 * | 9/2005 | Shinomi | 717/124 |
| 2005/0216885 A1 * | 9/2005 | Ireland | 717/108 |
| 2005/0235274 A1 * | 10/2005 | Mamou et al. | 717/136 |
| 2005/0257217 A1 | 11/2005 | Woollen | |
| 2005/0262499 A1 | 11/2005 | Read | |
| 2006/0080640 A1 | 4/2006 | Cheng et al. | |
| 2006/0101462 A1 * | 5/2006 | Spears | 717/177 |
| 2006/0136373 A1 | 6/2006 | Beust et al. | |
| 2007/0022409 A1 * | 1/2007 | Levenshteyn | 717/136 |
| 2007/0100953 A1 | 5/2007 | Fanshier et al. | |
| 2007/0282801 A1 | 12/2007 | Apte et al. | |
| 2007/0294364 A1 | 12/2007 | Mohindra et al. | |

(Continued)

OTHER PUBLICATIONS

Wessler, M., et al., Oracle Application Server 10g; J2EE Deployment and Administration, Apress, Sep. 2004, 12 pages, [retrieved on Jan. 30, 2012], Retrieved from the Internet: <URL:academic.safaribooksonline.com>.*

(Continued)

*Primary Examiner* — Tuan Q Dam
*Assistant Examiner* — Geoffrey St Leger
(74) *Attorney, Agent, or Firm* — Lowenstein Sandler PC (57) ABSTRACT

A method and apparatus for integrating aspect-oriented programming (AOP) into the deployment layer of an application server. In one embodiment, the method includes analyzing a structure of a deployment within an application server, and translating the deployment from a first form to a second form using results of the analyzing. The method further includes indicating in the deployment that a cross-cutting concern is to be resolved by aspects at runtime.

20 Claims, 9 Drawing Sheets

U.S. PATENT DOCUMENTS

| | | | |
|---|---|---|---|
| 2007/0294420 A1 | 12/2007 | Mohindra et al. | |
| 2007/0294666 A1 | 12/2007 | Papakipos et al. | |
| 2007/0294682 A1 | 12/2007 | Demetriou et al. | |
| 2008/0092134 A1 | 4/2008 | Zhang et al. | |
| 2008/0141335 A1* | 6/2008 | Thomas | 726/1 |
| 2008/0301627 A1* | 12/2008 | Stark | 717/106 |
| 2008/0301711 A1* | 12/2008 | Stark | 719/316 |

OTHER PUBLICATIONS

Fleury, M., et al., The JBoss Extensible Server, Proceedings of the ACM/IFIP/USENIX 2003 International Conference on Middleware, 2003, pp. 344-373, [retrieved on Jul. 23, 2012], Retrieved from the Internet: <URL:http://dl.acm.org/>.*

Popovici, A., et al., Just-In-Time Aspects: Efficient Dynamic Weaving for Java, Proceedings of the 2nd international conference on Aspect-oriented software development, 2001, pp. 100-109, [retrieved on Jul. 23, 2012], Retrieved from the Internet: <URL:http://dl.acm.org/>.*

U.S. Appl. No. 11/809,004, Notice of Allowance dated Oct. 4, 2010 (P201).

U.S. Appl. No. 11/809,004, Final Office Action dated May 28, 2010 (P201).

U.S. Appl. No. 11/809,006, Office Action dated Apr. 15, 2010 (P200).

Related U.S. Appl. No. 11/809,005 Office Action, mailed Sep. 13, 2010.

Kiczales, G. et al, "Aspect-Oriented Programming", published proceedings of the European Conf. on Object-Oriented Programming (ECOOP), Finland, pp. 1-25, Jun. 1997.

U.S. Appl. No. 11/809,004, Notice of Allowance dated Aug. 23, 2010 (P201).

U.S. Appl. No. 11/809,004, Office Action dated Dec. 9, 2009 (P201).

U.S. Appl. No. 11/809,004, Office Action dated May 28, 2010 (P201).

U.S. Appl. No. 11/809,006, Non-Final Office Action dated Apr. 15, 2010 (P200).

U.S. Appl. No. 11/809,006, Final Office Action dated Sep. 8, 2010 (P200).

USPTO, Notice of Allowance for U.S. Appl. No. 11/809,004 (P201) mailed on Oct. 4, 2010.

USPTO, Final Office Action for U.S. Appl. No. 11/809,005 (P086) mailed on Jan. 4, 2011.

USPTO, Office Action for U.S. Appl. No. 11/809,006 (P200) mailed on May 7, 2012.

Scott Stark, ProfileService management View, May 2, 2006, pp. 1-10.

Justin Guinney, JBoss Deployment, Mar. 31, 2005, pp. 1-2.

* cited by examiner

FIG. 3
MICROCONTAINER

FIG. 4

DEPLOYMENT LAYER CLASS DIAGRAM

PROFILE SERVICE

FIG. 8

MANAGEMENT INTERFACE

FIG. 9

INTEGRATING ASPECT ORIENTED PROGRAMMING INTO THE APPLICATION SERVER

TECHNICAL FIELD

The present invention relates generally to computer software. More particularly, this invention relates to the implementation of a Java-based application server.

BACKGROUND

An application server is a software engine that delivers applications to client computers or devices. An application server typically bundles middleware to enable applications to intercommunicate with dependent applications, like web servers, database management systems, and chart programs. Middleware is computer software that connects and integrates software components or applications. Middleware is used most often to support complex, distributed applications.

Conventionally, an application server is designed as monolithic executable code that implements all the required functionalities. The size of the code is very large and execution of the code consumes a significant amount of resources. It is also difficult to make changes to the code. Thus, some recent systems use a kernel to implement basic functions of the server, and add various plug-ins at runtime to implement additional features. A kernel is much smaller in size and is much easier to maintain and update than a conventional server.

For example, some application servers use Java Management Extensions (JMX)® as a kernel to integrate software, provide dynamic loading and instantiate classes at runtime. The JMX is a Java technology developed by Sun Microsystems, Inc. headquartered in Santa Clara, Calif. The JMX supplies tools for managing and monitoring system resources, including: applications, system objects, devices (e.g. printers) and service oriented networks. These resources are represented by objects called Managed Bean (MBean), which is a type of Java bean. However, the JMX supports only Mbeans. This reduces the flexibility of an application server that uses the JMX as a kernel. That is, the JMX kernel cannot be easily transported to environments where the Mbeans are not supported.

Moreover, an application server generally includes many components that share common features. Implementing these common features repeatedly across the components increase code size and complicates the code design.

Additionally, managing the components in an application server can be a complex task. Conventional techniques do not provide an efficient mechanism for managing the deployment on an application server and for access to the properties of a deployment.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for integrating aspect-oriented programming (AOP) into the deployment layer of an application server. The application server uses a microcontainer (MC) as a kernel to provide a runtime infrastructure for dynamically configuring deployments that are implemented by plain old Java objects (POJOs). "Dynamic configuration" herein refers to the assembly or construction of runtime objects by integrating plug-in features at runtime. Features of the deployments (deployed objects) and services provided to the deployments (kernel objects) can be dynamically constructed from a collection of aspects, according to the AOP design principles.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The MC is implemented as a lightweight kernel that has a small memory footprint. The MC interacts with POJOs. The application server includes a deployment layer to provide the MC with POJOs and metadata describing the properties of the POJOs. As the MC operates in a POJO environment, the MC can be deployed in any server environment and work with any kernel models.

An example of running an application program on the application server using the MC and the deployment layer is described below. For example, a deployment on an application server may be dynamically configured to provide the service of a shopping cart of an online store. The shopping cart service to be deployed may be implemented as a session bean, in the form of an Enterprise Java Bean (EJB). The shopping cart service may require the functionalities of security, transactions, locking, synchronization, and the like. The deployment layer takes the EJB, analyzes it and translates it into a collection of POJOs. The collection of POJOs is passed onto the MC during the deployment time as deployed objects. Based on the configuration settings and the analysis results of the deployment, the MC constructs kernel objects (e.g., a chain of interceptors) at runtime to provide the functionalities of the shopping cart.

The term "deployment" hereinafter refers both to the input of the deployment layer (e.g., the EJB in the above example) and to the output of the deployment layer (e.g., the POJOs in the above example). It is understood that a deployment at the input and output of the deployment layer may have different forms (e.g., EJB vs. POJOs).

In some embodiments, the MC and the deployment layer adopt aspect-oriented programming (AOP) design. Some objects in the MC and the deployment layer may be implemented by aspects, which represent common features scattered across methods, classes, or object hierarchies. The aspects may be implemented as POJO plug-ins, which are integrated into the runtime server configuration dynamically. The aspects can be customized plug-ins that are tailored to particular services or deployment types. Thus, the AOP design introduces a layer of customization over the existing infrastructure.

Embodiments of the MC are capable of processing deployments that implement the AOP design. For example, deployments may share common features such as security, logging, and management. The MC manages the deployments, their aspects, and the dependencies among the deployments and aspects. In response to a change to an aspect used by a deployed object during runtime, the MC identifies those objects affected by the change and determines actions for the affected objects, while maintaining dependencies among the deployed objects.

In some embodiments, the deployment layer may comprise two types of ordered deployers (e.g., structure deployers and translation deployers), which will be described in detail later. These deployers may also adopt the AOP design. Integrating the AOP into the deployment layer allows code reuse and, therefore, reduces the overall complexity and code size of the deployment layer. Using the AOP generally simplifies the design of the deployment layer with respect to those common features that cannot be easily described by the conventional object-oriented design. An ordered deployer can now be constructed with a collection of aspects and some additional code. Thus, instead of rewriting an entire deployer for a new deployment type (e.g., an EJB, a Web archive, a Java archive, etc.), a developer only needs to write the portion of the code that is specific to the new deployment type.

Figure 1:
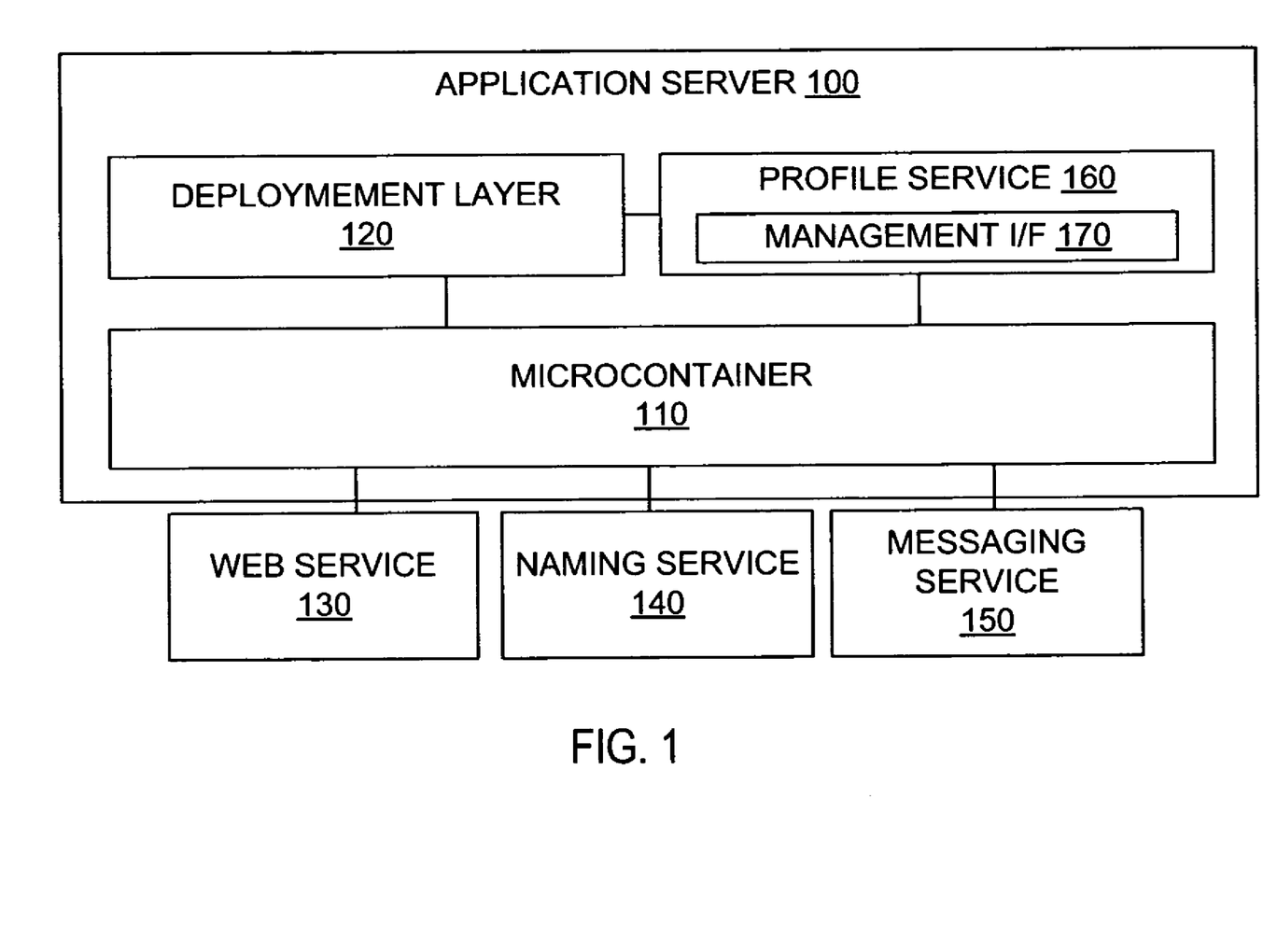
FIG. 1 illustrates an application server in which embodiments of the present invention may be implemented.

FIG. 1 shows an embodiment of an application server 100 that includes a microcontainer (MC) 110 as a kernel. MC 110 serves as an integration spine for various plug-in components. Application server 100 includes a deployment layer 120 for deploying services onto MC 110 for runtime operations. In addition to deployment layer 120, various other components can also be plugged into MC 110, including, but not limited to, a Web service 130, a naming service 140, a messaging service 150, and a profile service 160. All of the plug-in components interact with MC 110 using POJOs and metadata. Although shown as part of application server 100, MC 110 can be used standalone outside of application server 100 and can be plugged into any server environment. In some embodiments, MC 110 is implemented as a superset of the Spring Framework, which is Java-based open source software.

In some embodiments, application server 100 uses profile service 160 to manage lifecycles of the deployments, and to determine objects to instantiate when one of the deployments starts. Profile service 160 includes a management interface 170 for a system administrator to monitor and update managed properties of a deployment. Details on profile service 160 and management interface 170 will be described in greater details below with reference to FIGS. 6-8.

Figure 2:
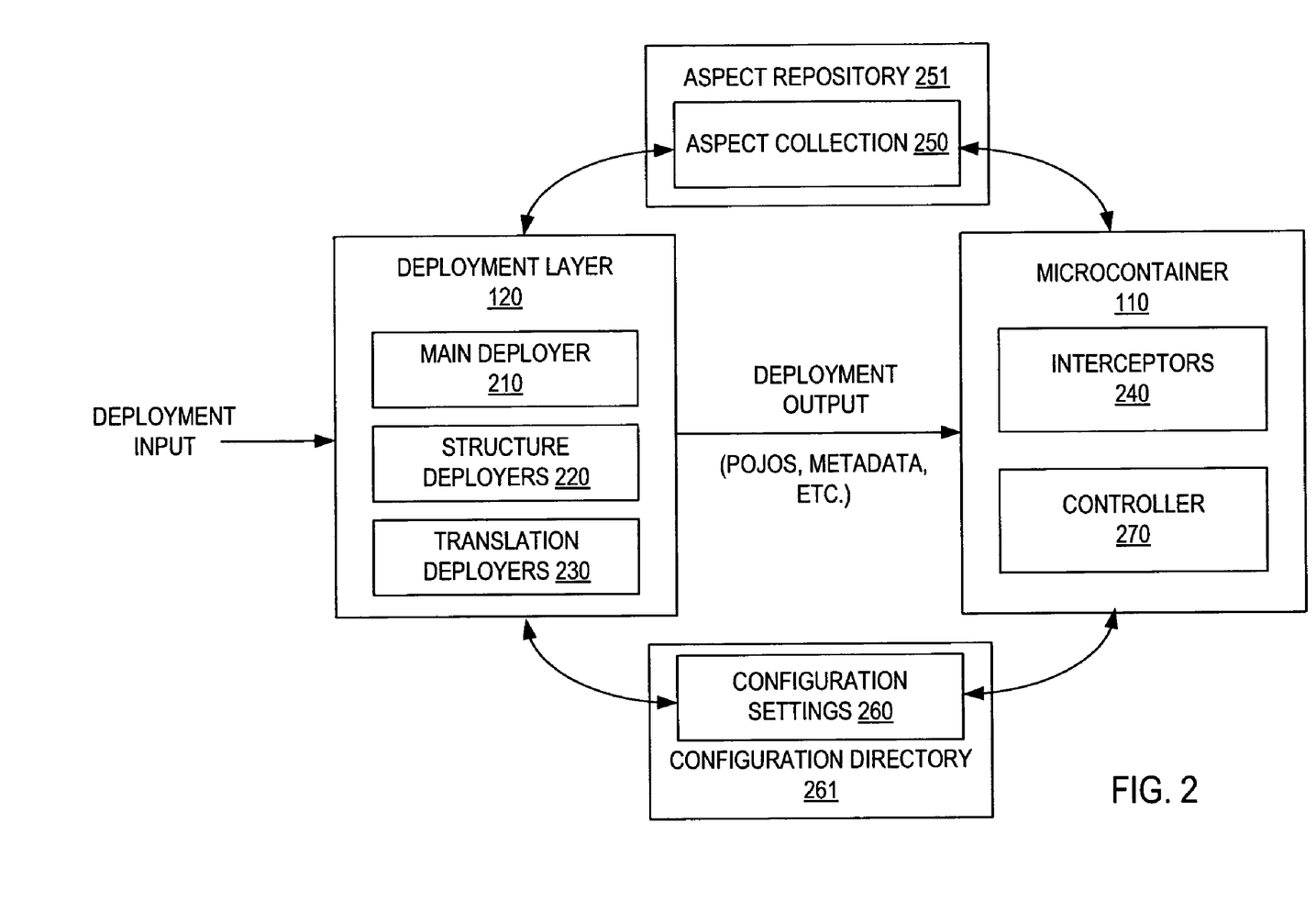
FIG. 2 illustrates an embodiment of a deployment layer and a microcontainer of the application server.

FIG. 2 shows an embodiment of MC 110 and deployment layer 120. Deployment layer 120 is highly extensible. That is, a component can be easily integrated into the deployment layer 120. Deployment layer 120 includes a main deployer 210, structure deployers 220 and translation deployers 230. The operations of structure deployers 220 and translation deployers 230 follow a pre-determined sequencing order. Thus, structure deployers 220 and translation deployers 230 are also referred to, collectively, as ordered deployers. Main deployer 210 is the deployment entry point. Requests to deploy a component are sent to main deployer 210, and main deployer 210 determines which structure deployers 220 and translation deployers 230 are capable of handling the deployment. This determination is based on the type of the deployment input, e.g., an EJB or a JAR. Structure deployers 220 analyze the structure of the deployment to generate a metadata structure (e.g., a tree of metadata) to describe the structure and dependencies of the deployment. For example, the metadata may indicate that certain POJOs should be run together or wired in a particular way, or one POJO should be given to another POJO at a certain time. The metadata may come from the deployment input as well as the analysis of structure deployer 220. Translation deployers 230 translate the deployment from an input form to an output form. The input form may be an EJB, a Web archive, a Java archive (JAR), or any other forms. The output form is Java objects, e.g., POJOs. More details about deployment layer 120 will be described later with references to FIG. 4 and FIG. 5.

After deployment layer 120 analyzes and translates a deployment, the resulting POJOs and the metadata are passed onto MC 110 for runtime operations. The MC 110 includes interceptors 240 and a controller 270. Interceptors 240 perform operations on the POJOs, and controller 270 manages the dependencies in the deployment. Interceptors 240 may be constructed as POJO-based aspects. In one embodiment, controller 270 is an Inversion-of-Control (IOC) state machine. IOC, also known as dependency injection, is a programming model which maintains dependencies among components by supplying a plug-in architecture. A component designed according to IOC does not acquire an object from other components that it depends on. Instead, the component declares the dependencies, and MC 110 supplies or injects the necessary objects. The injected object is a provider of some capability or resource. For example, an interceptor 240 that provides a service for a POJO can be injected under the control of controller 270 when the service is needed.

Controller 270 manages dependencies based on dependency information passed on from deployment layer 120 in the form of metadata. The dependency information may indicate that certain POJOs in a deployment use an aspect during runtime. If a change to the aspect is made, IOC state machine 270 identifies the POJOs affected by the aspect change and determines the actions for affected POJOs while maintaining dependencies among the POJOs. Further, if an aspect is changed, controller 270 also determines whether to restart a service associated with the affected POJOS, or whether to reinject an interceptor that provides resources for the affected deployed objects.

In the embodiment of FIG. 2, MC 110 and deployment layer 120 both have access to an aspect collection 250 stored in an aspect repository 251. Aspect collection 250 includes a collection of aspect code, or aspects, each implementing a common feature. These common features are sometimes referred to as cross-cutting concerns, which mean common concerns that cut across different components. A cross-cutting concern can be abstracted and encapsulated by an aspect. An aspect may be implemented as a plain Java class that encapsulates the aspect code and provides a pointcut definition, which defines when to execute the aspect code. An aspect is applied when a pointcut in a component is encountered. A pointcut is encountered when the pointcut definition matches the events or points within the component. For example, a valid pointcut definition is "for all calls to the method executeQuery( ), call the aspect that verifies SQL syntax."

In some embodiments, aspects can be used to construct at least a portion of structure deployer 220, translation deployer 230, the output of deployment layer 120, and interceptors 240. The components that use aspect collection 250 are dynamically constructed or assembled at runtime. The aspects may be implemented as plug-ins that are dynamically called by the components that use them. For example, MC 110 may construct the interceptors 240 necessary for running a deployment from the aspects during the runtime.

In one embodiment, aspect collection 250 includes aspects that span a wide range of application domains. For example, the aspects may include, but are not limited to, security, transaction, persistence, logging, transport, availability, management, and clustering. In addition, aspect collection 250 may include customized aspects, and new aspects can be added at any point of time. Thus, a developer of application server 100 is not restricted to the existing aspects, but is able to add new aspects tailored to particular services. For example, a developer of deployment layer 120 can customize new aspects and plug them into existing deployers using class loading and other mechanisms. Class loading refers to the loading of a class file at runtime. The class file contains a class that represents, for example, an aspect. The existing deployers with the added new aspects may be able to handle a different deployment type. Thus, the existing code can be reused and the cost of developing new deployers is reduced.

It is understood that some aspects may be more common to a deployment than to a deployer. For example, security and logging may be more common for a deployment than for a deployer, while class loading may be common to both deployments and the deployers. More details on the AOP design for deployment layer 120 will be provided with reference to FIG. 4 and FIG. 5.

MC 110 and deployment layer 120 both have access to a configuration directory 261 storing configuration settings 260 of deployments. When analyzing and translating a deployment, deployment layer 120 parses configuration settings 260 of the deployment to determine the dependency information and the necessary aspects for the deployment. For example, if the deployment involves a bank transaction and has an advanced security setting, an aspect implementing the advanced security will be used in the creation of POJOs. MC 110 accesses configuration settings 260 for the features that are dynamically configurable at runtime. For example, if configuration settings 260 indicate that a deployment is on-demand, MC 110 will deploy the deployment, but will not start it until the service provided by the deployment is demanded.

Additionally, in some embodiments, MC 110 manages many different services in a hot-deployed environment. That is, new components, such as a new structure deployer, a new translation deployer, or a new aspect, can be plugged into MC 110 at runtime without stopping the operations of MC 110.

Figure 3:
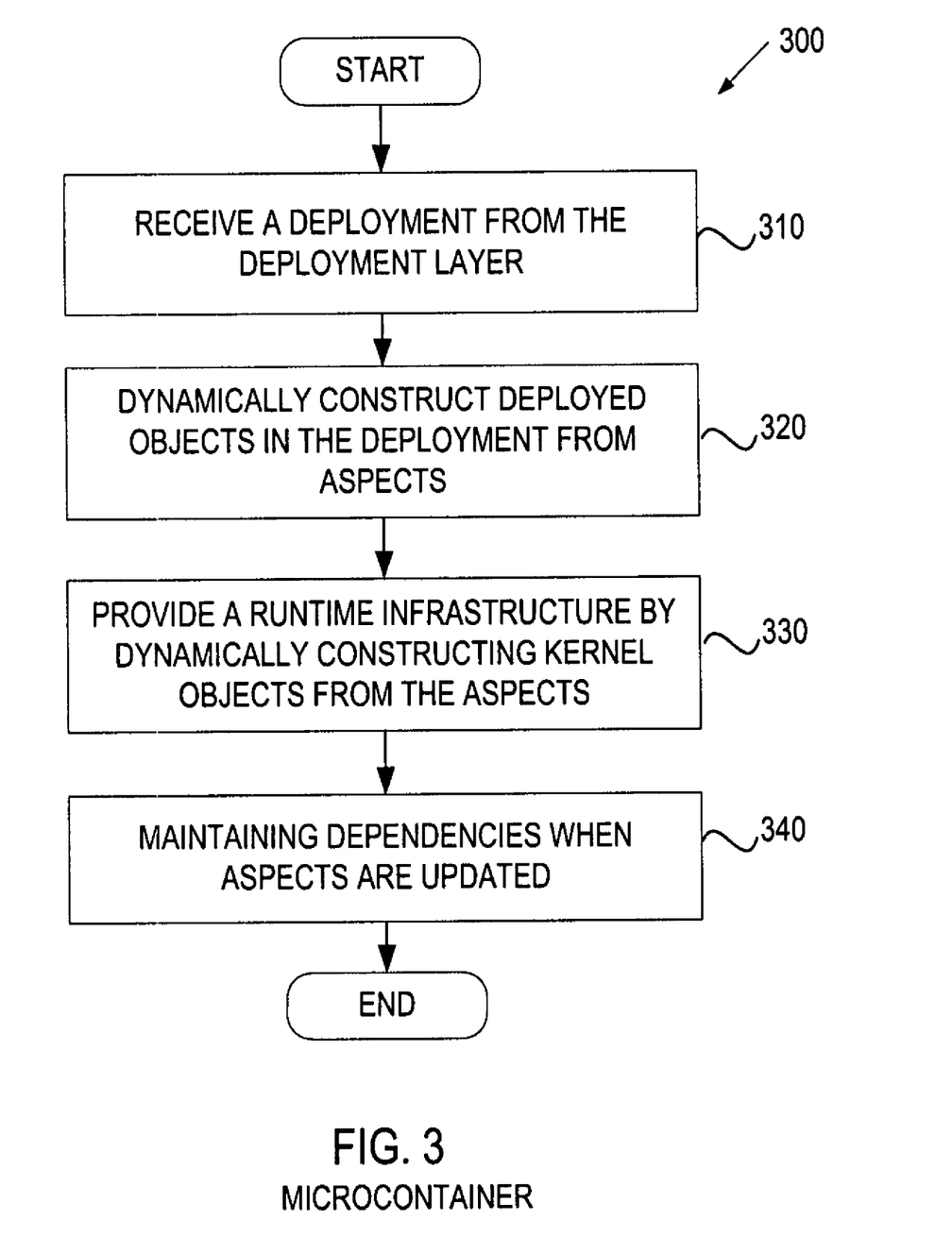
FIG. 3 is a flow diagram of one embodiment of a method performed by the microcontainer.

FIG. 3 is a flow diagram of one embodiment of a method 300 for performing runtime operations for deployments. Method 300 may be performed by processing logic 926 of FIG. 9 that may comprise hardware (e.g., circuitry, dedicated logic, programmable logic, microcode, etc.), software (such as instructions run on a processing device), or a combination thereof. In one embodiment, method 300 is performed by MC 110 of FIG. 1.

Referring to FIG. 3, at block 310, method 300 begins with processing logic 926 receiving a deployment from deployment layer 120 after analyzed and translated by deployment layer 120. At block 320, processing logic 926 dynamically constructs the deployed objects in the deployment from aspects, e.g., the aspects in aspect collection 250 of FIG. 2. For example, a security aspect may be plugged-in at a pointcut of a deployed object as identified by deployment layer 120. At block 330, a runtime infrastructure (such as interceptors 240) is provided for the deployment. The provision of the runtime infrastructure is automatic and dynamic, and may adapt to different deployment types (e.g., Web archives, JAR, EJB, etc.). The runtime infrastructure is provided by dynamically constructing the kernel objects (e.g., interceptors 240) from aspects for runtime operations of the deployed objects. At block 340, processing logic 926 maintains the dependencies of the deployment when an aspect is updated. For example, the dependencies are maintained by identifying the objects that use the aspect and propagate the update to the objects.

Figure 4:
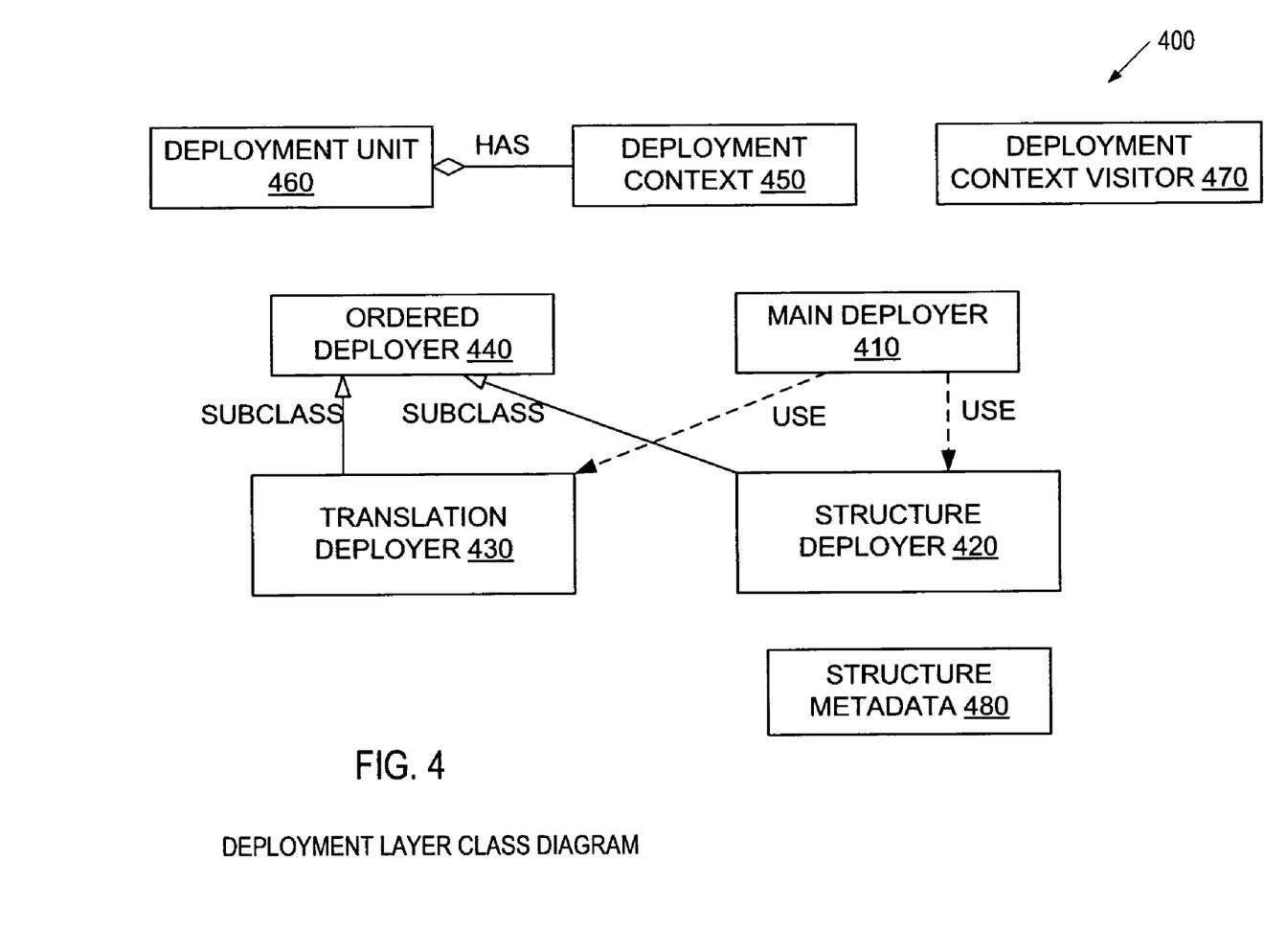
FIG. 4 illustrates a class diagram of an embodiment of the deployment layer.

FIG. 4 illustrates an example of a Unified Modeling Language (UML) class diagram 400 of deployment layer 120, according to one embodiment of the invention. For the purpose of illustration, diagram 400 only shows a portion of the classes relevant to the discussions herein. The blocks in diagram 400 represent the classes that define deployment layer 120 of FIG. 1. Diagram 400 shows a main deployer 410 as the deployment entry point. Main deployer 410 handles the parsing of a deployment archives (e.g., Web archives, JAR, EJB, etc.) into deployment instances, and the deployment of those instances into MC 110. Main deployer 410 calls structure deployers 420 and translation deployers 430. Each of deployers 420 and 430 is registered with main deployer 410 as a subclass of an ordered deployer 440. Generally, both types of deployers 420 and 430 need to be run in a predetermined order for the aspects to be constructed correctly.

Structure deployers 420 are used to analyze the structure of a new deployment context 450 when it is added to deployment layer 120 of FIG. 1. A deployment context is a representation of the structural aspects of deployable objects. For example, a new deployment context (foo) can be added by invoking a method of main deployer 410 addDeploymentContext(foo). In response to the addition of the new deployment context, a method of structure deployer 420 determineStructure(foo) is invoked to analyze the deployment. If the deployment is recognized, structure deployer 420 returns true to indicate that no other structure deployer 420 is needed to further analyze the new deployment context. If structure deployer 420 returns false, a next structure deployer 420 in the ordered list is invoked to further analyze the deployment.

A deployment is described by its deployment contexts 450 and associated deployment units 460. Deployment context 450 is generally represented by a hierarchical data structure, e.g., a tree. Structure deployers 420 analyze a deployment by calling deployment context visitors 470. Deployment context visitors 470 traverse deployment context 450 according to a pre-defined algorithm, e.g., depth-first or breadth-first. The result of the analysis can be represented by a tree of structure metadata 480 that describes the structure and dependencies of the deployment.

Translation deployers 430 are used to translate deployment units 460 into runtime POJOs. The methods of translation deployers 430 include:
  isRelevant( ): does the deployer want to process the unit,
  prepareDeploy( ): take the new deployment to the ready stage,
  prepareundeploy( ): get ready to undeploy,
  handoff(new, old): handover control from new to old,
  commitDeploy( ): new deployment is now in control,
  commitundeploy( ): old deployment is out of here, and
  getRelativeOrder( ): specify the relative order of the deployer in a chain.

Each of deployers 420 and 430 is designed for a particular type of a deployment. For example, EJB deployers are designed for EJBs, JAR deployers are designed for JAR files, etc. These deployers may share certain common behaviors. As mentioned above with reference to FIG. 2, deployment layer 120 has access to aspect collection 250 for constructing the deployers 220 and 230. The aspects may be implemented as plugins that are dynamically called by the deployer process. Thus, aspect code may be reused across the deployers to implement the common behaviors in each of these deployers.

A deployment may also include features that are commonly seen in deployments. For example, security and logging are typically used in deployments to ensure the security of a service (e.g., online banking) and to monitor the performance of a service (e.g., a printer monitor). These commonly-seen features can be implemented by aspects. The output generated by the deployers for a deployment indicates which aspect code to apply and when to apply the aspect code, as well as the dependencies among the aspects and the objects that use the aspects. The information is passed on to MC 110 to track which deployed objects use which aspects.

Figure 5A:
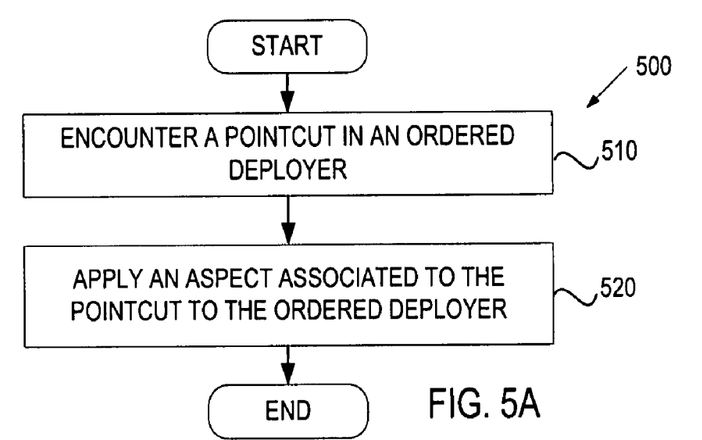
FIG. 5A is a flow diagram of one embodiment of a method for applying an aspect to the deployment layer.
Figure 5B:
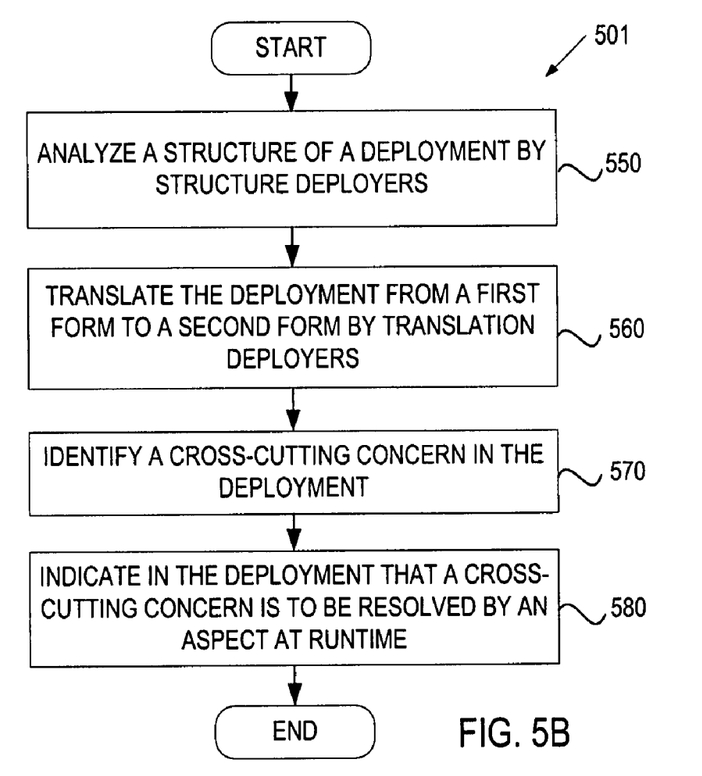
FIG. 5B is a flow diagram of one embodiment of a method for identifying an aspect in the deployment.

FIG. 5A and FIG. 5B are flow diagrams of one embodiment of a method 500 for applying an aspect to deployment layer 120 and a method 501 for identifying an aspect in the deployment. Methods 500 and 501 may be performed by processing logic 926 of FIG. 9 that may comprise hardware (e.g., circuitry, dedicated logic, programmable logic, microcode, etc.), software (such as instructions run on a processing device), or a combination thereof. In one embodiment, methods 500 and 501 are performed by ordered deployer 440 (e.g., structure deployer 420 and/or translation deployer 430) of FIG. 4.

Referring to FIG. 5A, processing logic 926 applies an aspect to deployment layer 120 to dynamically construct the code that implements the functionalities of deployment layer 120. At block 510, method 500 begins when a pointcut in ordered deployer 440 is encountered. As mentioned above, a pointcut defines when to apply an aspect to the deployer code. At block 520, the aspect associated with the pointcut is applied to the deployer code. Thus, the code that implements the functionalities of order deployer 440 is dynamically constructed during the runtime of the ordered deployer.

Referring to FIG. 5B, processing logic 926 identifies the portions of the deployment that can be constructed by aspects when the deployment is presented to main deployer 410. At block 550, structure deployer 420 is called to analyze the structure of the deployment. The analysis result is a hierarchical structure (e.g., a tree) of metadata describing the structure and dependencies of the deployment. At block 560, translation deployer 430 is called to translate the deployment from a first form (the input form) to a second form (the POJOs). Translation deployer 430 uses the analysis result generated by structure deployer 420 to perform the translation. During the process of analysis and translation, at block 570, a cross-cutting concern may be identified in the deployment. At block 580, an indication is added to the deployment indicating that the cross-cutting concern is to be resolved by an aspect during runtime of the deployment. The deployment is then ready to be deployed on MC 110.

Referring again to FIG. 1, in some embodiments, profile service 160 is used to provide a runtime infrastructure for dynamically configuring deployed objects. Profile service 160 manages deployments generated from deployment layer 120. Thus, instead of passing deployments directly onto MC 110, the deployments are deposited into a repository of profile service 160. Profile service 160 also receives the metadata describing the structure and dependencies of the deployments and has access to configuration settings of the deployments. Based on the information, profile service 160 manages lifecycles of the deployments, e.g., when to start and end a deployment, and determines the objects to instantiate when the deployments start. Profile service 160 also manages updates to the deployments. For example, if a property of a deployment is changed, profile service 160 will propagate the change to the components of the deployment that uses the property.

Figure 6:
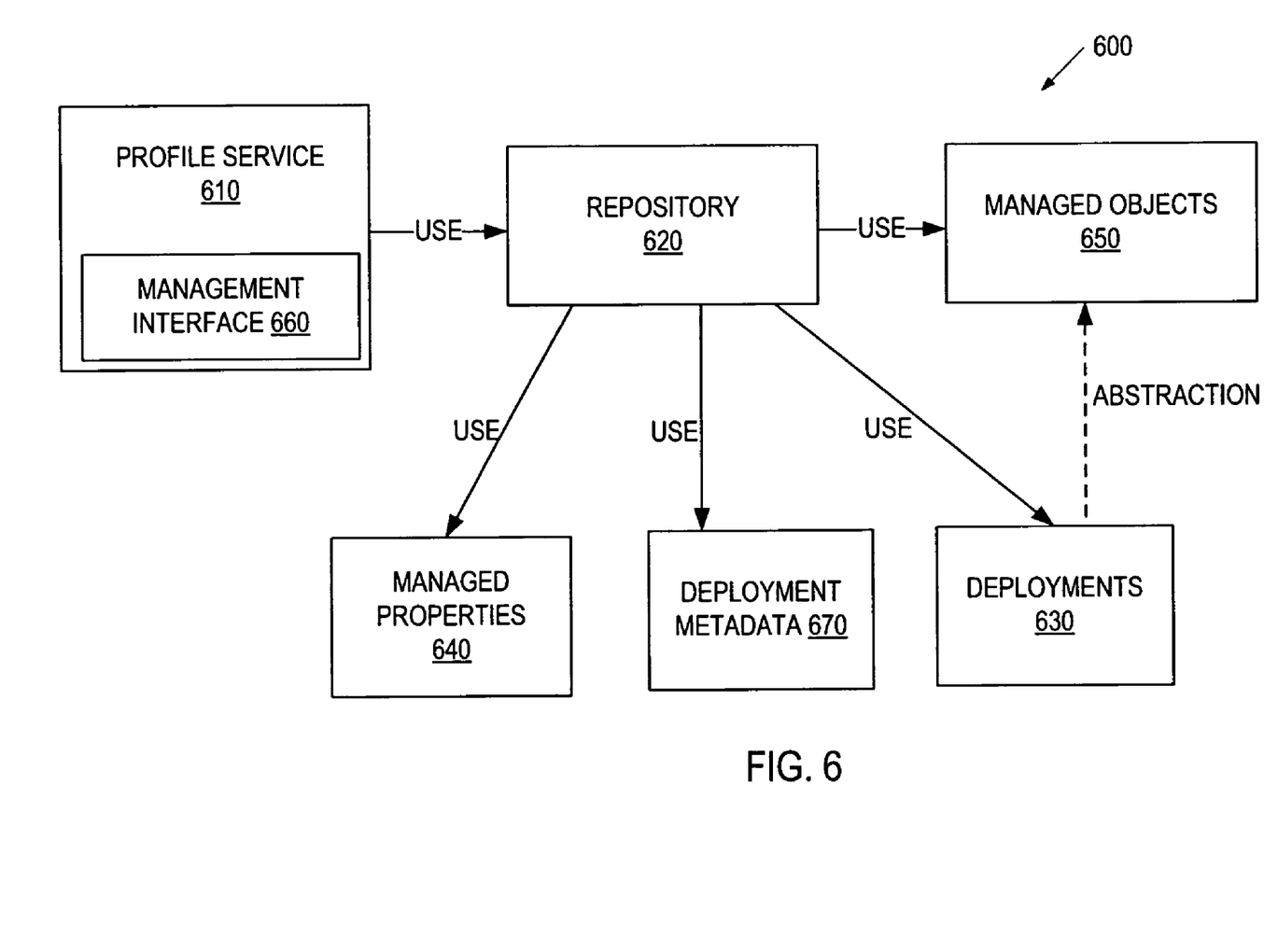
FIG. 6 illustrates a class diagram of an embodiment of a profile service of the application server.

FIG. 6 shows a diagram 600 of a profile service 610 according to one embodiment of the invention. Profile service 610 manages the deployments and their properties through a repository 620, wherein deployments 630, deployment metadata 670, and managed properties 640 associated with deployment 630 are deposited. Repository 620 also uses managed objects 650, which is a generalization of deployments 630. That is, every deployment 630 is a managed object 650, but not every managed object 650 is a deployment 630.

Profile service 610 implements the functionalities of managing deployments, such as getDeployment, addDeployment, and removeDeployment. Profile service 610 also implements the functionalities of managing deployers, such as getDeployer, addDeployer, and removeDeployer. Thus, profile service 610 implements a centralized management model for all the deployments, whether they are to be deployed or have already been deployed. Using deployment metadata 640 and property information supplied by managed objects 650, profile service 610 is able to manage lifecycles of the deployments and determines the objects to instantiate when the deployments start. A lifecycle of a deployment includes the start and end of the deployment.

Figure 7:
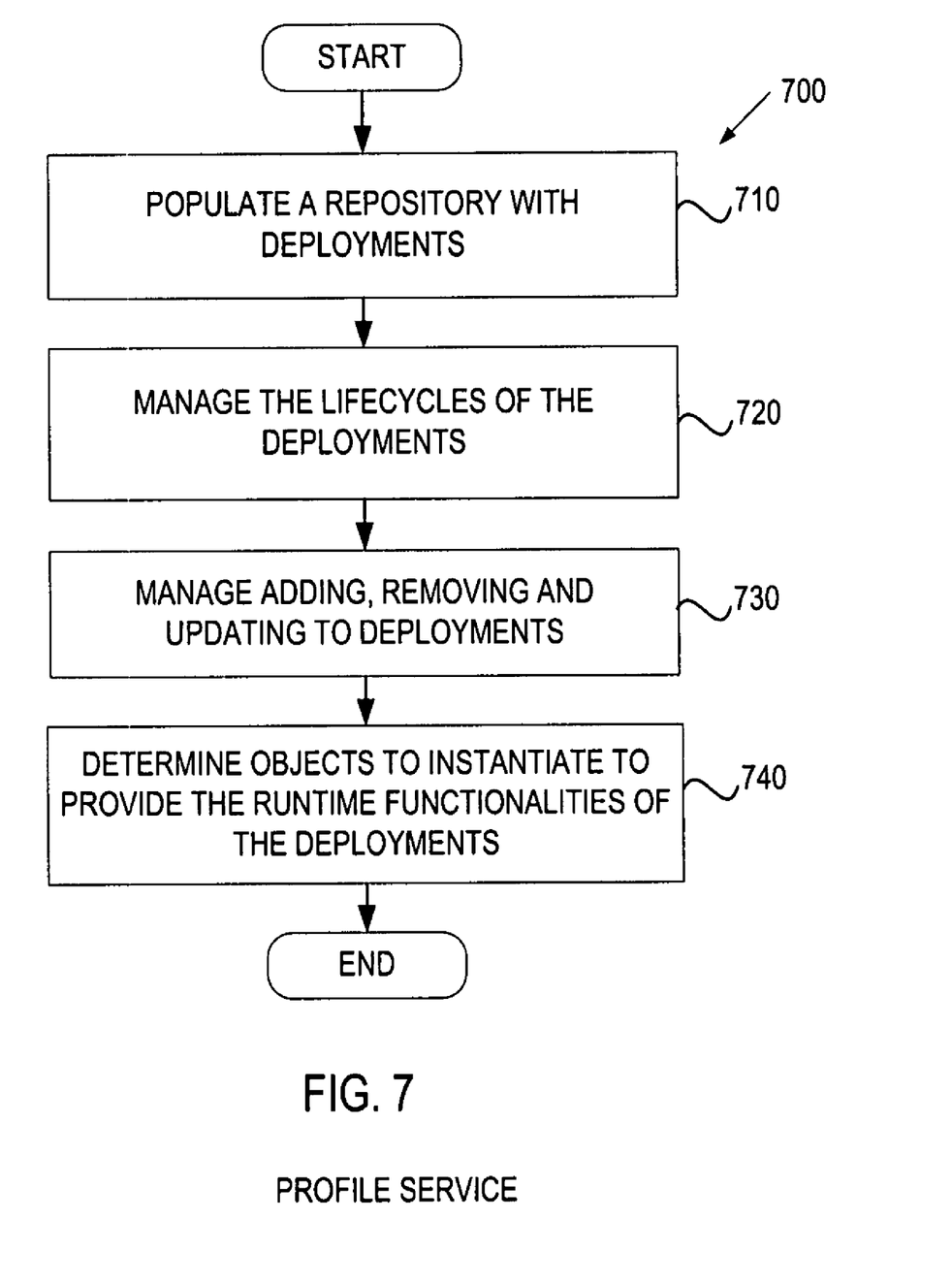
FIG. 7 is a flow diagram of one embodiment of a method performed by the profile service.

FIG. 7 is a flow diagram of one embodiment of a method 700 for managing deployments on an application server, e.g., application server 100 of FIG. 1. Method 700 may be performed by processing logic 926 of FIG. 9 that may comprise hardware (e.g., circuitry, dedicated logic, programmable logic, microcode, etc.), software (such as instructions run on a processing device), or a combination thereof. In one embodiment, method 700 is performed by profile service 160 of FIG. 1 or profile service 610 of FIG. 6.

Referring to FIG. 7, at block 710, method 700 begins with processing logic 926 populating repository 620 with deployments. The deployments have been processed by deployment layer 120, but may or may not have been deployed on MC 110 for runtime operations. At block 720, processing logic 926 manages the lifecycles of the deployments based on the configuration and properties of each deployment. For example, profile service 610 maintains the status of a deployment, such as active, disabled, and on demand, to reflect the current stage of the deployment lifecycle. At block 730, processing logic 926 manages addition and removal of a deployment, as well as updates to a deployment. Any changes to the deployments will be propagated to appropriate components in the deployments. There are many ways a change can be made to a deployment. For example, an update can be made to managed property 640 of a deployment through a management interface 660 of FIG. 6. An update can also be made by adding plug-ins to a deployment at runtime. At block 740, when a deployment starts its runtime operation, processing logic 926 determines objects (e.g., POJOs) to instantiate to provide the runtime functionalities of the deployment. The instantiated POJOs may include the POJOs implementing the deployment and the POJOs implementing interceptor 240 (FIG. 2) that executes the deployment.

Additionally, in some embodiments, profile service 610 maintains a revision history for changes made to it. The changes are stored in the repository 620. Thus, a system administrator can roll back to a previous version or can set profile service 610 to a particular version.

In one embodiment, profile service 610 provides management interface 660 for an administrator to access managed properties 640 of a deployment. Each management interface 660 is associated with a deployment. Management interface 660 can be implemented as an aspect that addresses the cross-cutting concern of component management. Managed properties 640 typically are a subset of the properties that a deployment has. Limiting managed properties 640 to a subset simplifies the management of a deployment.

In conventional JMX-based systems, all the plug-ins are management beans (Mbeans). For example, an Mbean may represent a connection to a printer. The Mbean includes predefined information having every necessary detail to implement the operations of printer connection. Detailed properties of the Mbean can be exported to an administrative interface to allow a system administrator read and update the properties. However, in a real-life scenario, these detailed properties generally include more information than what is necessary for a system administrator. For example, it is possible that only three properties out of fifty total detailed properties are of interest to a system administrator. Managed properties 640, in the above example, represent those three properties specified by the system administrator, e.g., a counter that counts the number of pages printed, a reset that resets the printer, and an alert that indicates out-of-paper. These managed properties 640 will be exported to management interface 660.

The managed properties are generated by structure deployers 420 of FIG. 4 during the analysis phase of a deployment. A developer, such as the person who writes structure deployer 420, can define what he/she wants to see in management interface 660 associated with the deployment. The definition can be in the form of metadata or annotation, and can be part of the configuration of the structure deployer 420 that generates the description of management interface 660. Thus, structure deployer 420 generates two different views of a deployment. One view including all the properties of a deployment is passed onto MC 110 for runtime operations. Another view (the management view) includes managed properties 640 that are of interest to a system administrator. These managed properties 640 are integrated by profile service 610 to define management interface 660 associated with the deployment. Thus, profile service 610 manages the deployments and their associated management interfaces 660.

Figure 8:
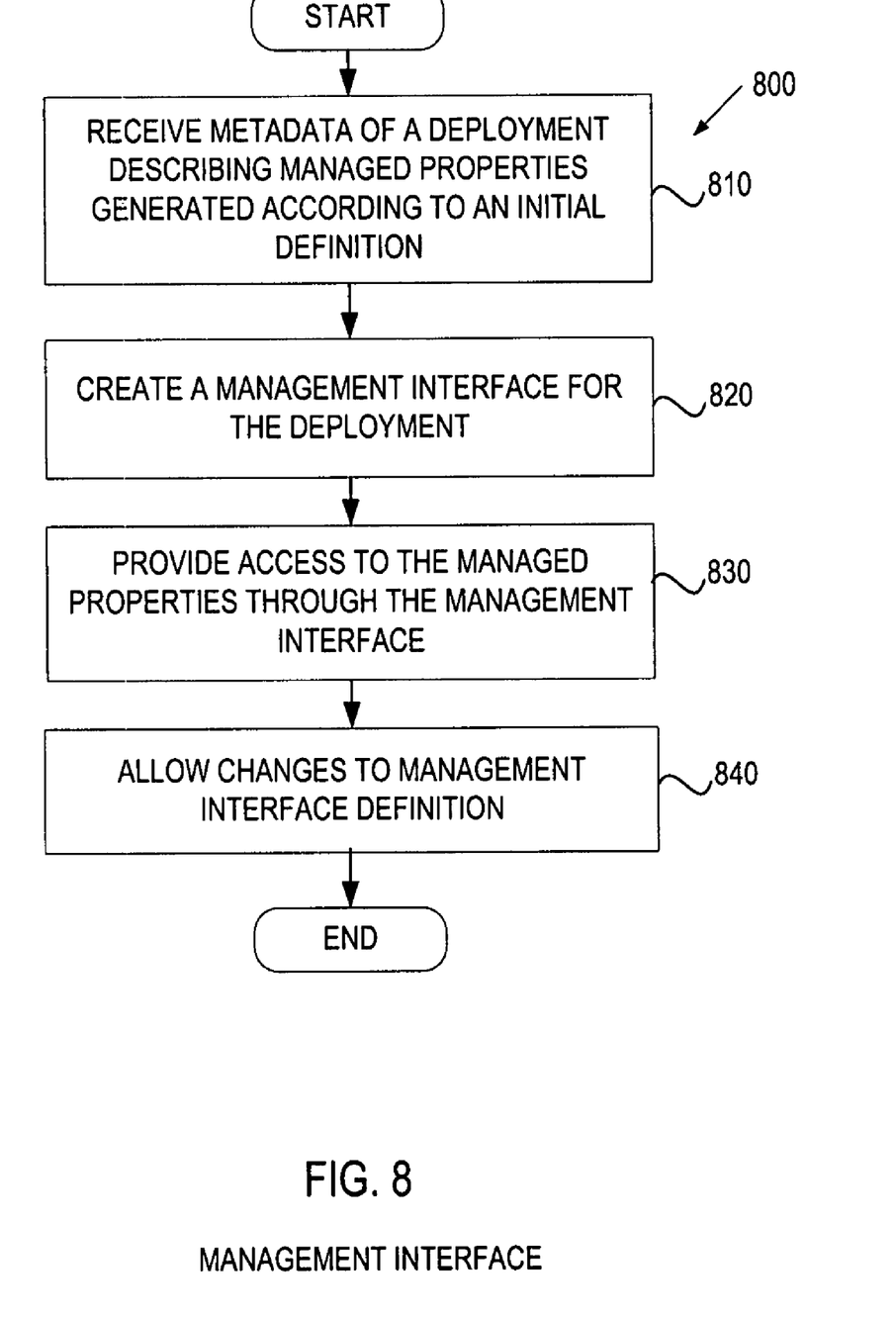
FIG. 8 is a flow diagram of one embodiment of a method for providing a management interface for a deployment.

FIG. 8 is a flow diagram of one embodiment of a method 800 for providing a management interface for a deployment. Method 800 may be performed by processing logic 926 of FIG. 9 that may comprise hardware (e.g., circuitry, dedicated logic, programmable logic, microcode, etc.), software (such as instructions run on a processing device), or a combination thereof. In one embodiment, method 800 is performed by profile service 160 of FIG. 1 or profile service 610 of FIG. 6.

Referring to FIG. 8, at block 810, method 800 begins with processing logic 926 receiving metadata describing managed properties of a deployment. The metadata is a subset of the tree of metadata generated by structure deployer 420 for describing the structure and dependencies of the deployment. The metadata is generated based on a configuration of structure deployer 420. At block 820, processing logic 926 generates management interface 660 for the deployment based on the information received from structure deployer 420. At block 830, processing logic 926 provides access to the managed properties through management interface 660. A system administrator can read or update the managed properties through management interface 660. Changes made to the deployment through management interface overrides the existing properties of the deployment. At block 840, processing logic 926 allows changes be made to management interface 660. This functionality provides the system administrator with the ability, for example, to correct mistakes and add missing interfaces.

Figure 9:
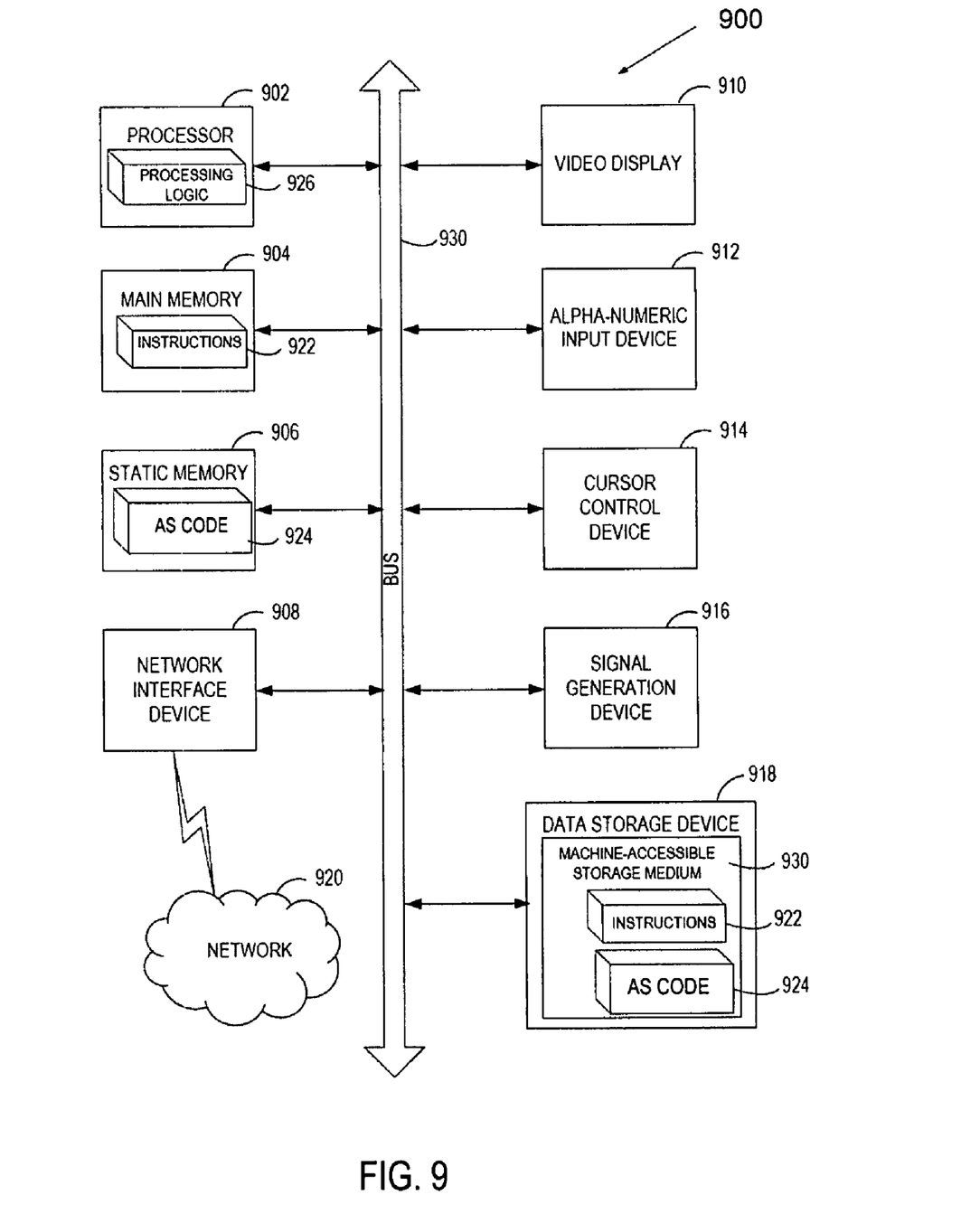
FIG. 9 illustrates a block diagram of an exemplary computer system implementing some embodiments of the present invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 930 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-accessible storage media. The software 922 may further be transmitted or received over a network 920 via the network interface device 908.

The machine-accessible storage medium 930 may also be used to store the code implementing the various components of application server (AS) 100 of FIG. 1. The code may also be stored in other sections of computer system 900, such as static memory 906.

While the machine-accessible storage medium 930 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for integrating AOP into the deployment layer of an application server have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving, by a main deployer of an application server computing device, a request for a deployment of a service provided by the application server computing device, the request comprising a deployment input;
   selecting, by the main deployer, a structure deployer of a plurality of structure deployers and a translation deployer of a plurality of translation deployers based on a type of the deployment input, wherein the plurality of structure deployers and the plurality of translation deployers are components of the application server computing device;
   analyzing, by the selected structure deployer, the deployment input to determine functionalities required by the deployment and dependencies of the deployment;
   generating, by the selected structure deployer based on the analyzing of the deployment input, a metadata structure to describe a structure of the deployment and the dependencies of the deployment;
   indicating, by the selected structure deployer, in the generated metadata structure that a cross-cutting concern associated with the deployment is to be resolved by aspects at runtime;
   translating, by the selected translation deployer based on the generated metadata structure, the deployment from a first form of the deployment input to a second form of a deployment output; and
   providing the generated metadata structure and the deployment output in the second form to a microcontainer for runtime operations of the deployment.

2. The method of claim 1 further comprising:
   applying the aspects to at least one of the structure deployer and the translation deployer.

3. The method of claim 1 wherein translating the deployment further comprises:
   translating the deployment input into the second form comprising a collection of Plain Old Java Objects (POJOs).

4. The method of claim 1 further comprising:
   implementing each of the aspects as a customized plug-in to encapsulate aspect code and specify when to execute the aspect code.

5. The method of claim 1 wherein analyzing a deployment input further comprises:

producing a graph of metadata describing the dependencies of the deployment.

6. The method of claim 1 further comprising:
sequencing operations performed by the structure deployer and the translation deployer according to a pre-determined ordering sequence.

7. The method of claim 1 further comprising:
implementing the aspects as plug-ins to be dynamically called by the structure deployer and the translation deployer.

8. The method of claim 1 further comprising:
implementing at least one of the aspects as a customized plug-in.

9. The method of claim 1 further comprising:
using the main deployer as a deployment entry point.

10. The method of claim 1 wherein the microcontainer is implemented as a kernel that constructs the deployment at runtime with the aspects.

11. A system comprising:
a memory;
a processing device communicably coupled to the memory;
a deployment layer executable from the memory by the processing device, the deployment layer comprising:
a main deployer configured to:
receive a request for a deployment of a service provided by the system, the request comprising a deployment input;
select a structure deployer of a plurality of structure deployers and a translation deployer of a plurality of translation deployers based on a type of the deployment input;
the structure deployer communicably coupled to the main deployer and configured to:
analyze the deployment input to determine functionalities required by the deployment and dependencies of the deployment; and
generate, based on the analysis of the deployment input, a metadata structure to describe a structure of the deployment and the dependencies of the deployment; and
indicate in the generated metadata structure that a cross-cutting concern associated with the deployment is to be resolved by aspects at runtime, the aspects stored in the memory; and
the translation deployer communicably coupled to the main deployer and configured to translate, based on the generated metadata structure, the deployment from a first form of the deployment input to a second form of a deployment output; and
a microcontainer executable from the memory by the processing device and communicably coupled to the deployment layer, the microcontainer configured to:
receive the generated metadata structure and the deployment output in the second form; and
perform runtime operations of the deployment using the received metadata structure and deployment output.

12. The system of claim 11 wherein operations of the structure deployer and the translation deployer follow a pre-determined order.

13. The system of claim 11 wherein the aspects include customized plug-ins implemented by Plain Old Java Objects (POJOs).

14. The system of claim 11 wherein at least one of the structure deployer and the translation deployer is constructed by the collection of aspects.

15. A non-transitory machine-accessible storage medium including data that, when accessed by a machine, cause the machine to perform a method comprising:
receiving, by a main deployer of an application server computing device, a request for a deployment of a service provided by the application server computing device, the request comprising a deployment input;
selecting, by the main deployer, a structure deployer of a plurality of structure deployers and a translation deployer of a plurality of translation deployers based on a type of the deployment input, wherein the plurality of structure deployers and the plurality of translation deployers are components of the application server computing device;
analyzing, by the selected structure deployer, the deployment input to determine functionalities required by the deployment and dependencies of the deployment;
generating, by the selected structure deployer based on the analyzing of the deployment input, a metadata structure to describe a structure of the deployment and the dependencies of the deployment;
indicating, by the selected structure deployer, in the generated metadata structure that a cross-cutting concern associated with the deployment is to be resolved by aspects at runtime;
translating, by the selected translation deployer based on the generated metadata structure, the deployment from a first form of the deployment input to a second form of a deployment output; and
providing the generated metadata structure and the deployment output in the second form to a microcontainer for runtime operations of the deployment.

16. The non-transitory machine-accessible storage medium of claim 15 wherein the structure deployer and the translation deployer are constructed by the aspects.

17. The non-transitory machine-accessible storage medium of claim 15 wherein translating the deployment further comprises:
translating the deployment input into the second form comprising a collection of Plain Old Java Objects (POJOs).

18. The non-transitory machine-accessible storage medium of claim 15 wherein the method further comprises:
implementing at least one of the aspects as a customized plug-in.

19. The non-transitory machine-accessible storage medium of claim 15 wherein analyzing a deployment input further comprises:
producing a graph of metadata describing the dependencies of the deployment.

20. The non-transitory machine-accessible storage medium of claim 15 wherein the microcontainer is implemented as a kernel that constructs the deployment at runtime with the aspects.

* * * * *